(12) United States Patent  
Rospo

(10) Patent No.: US 9,002,839 B1  
(45) Date of Patent: Apr. 7, 2015

(54) PERSONALIZING CONTENT FOR USERS

(75) Inventor: Stephen B. Rospo, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 811 days.

(21) Appl. No.: 11/905,298

(22) Filed: Sep. 28, 2007

(51) Int. Cl.  
*G06F 17/30* (2006.01)  
*G06Q 30/06* (2012.01)

(52) U.S. Cl.  
CPC .................................. *G06Q 30/0607* (2013.01)

(58) Field of Classification Search  
CPC .......... G06Q 30/0261; G06Q 30/0282; G06Q 30/0601; G06Q 99/00; G06F 17/30696  
See application file for complete search history.

(56) References Cited

U.S. PATENT DOCUMENTS

| 6,266,649 | B1 | 7/2001 | Linden et al. |
| 6,317,722 | B1 * | 11/2001 | Jacobi et al. ................ 705/14.51 |
| 6,718,551 | B1 * | 4/2004 | Swix et al. ....................... 725/32 |
| 7,884,274 | B1 * | 2/2011 | Wieder ............................ 84/609 |
| 2003/0163399 | A1 * | 8/2003 | Harper et al. .................... 705/35 |
| 2003/0212759 | A1 * | 11/2003 | Wu ................................ 709/218 |
| 2007/0061333 | A1 * | 3/2007 | Ramer et al. ..................... 707/10 |
| 2007/0174147 | A1 * | 7/2007 | Klein, Jr. ......................... 705/28 |
| 2007/0282902 | A1 * | 12/2007 | Bustelo et al. ............. 707/104.1 |

OTHER PUBLICATIONS

PodcastAlley (http://www.podcastalley.com/), as printed on Sep. 12, 2007 (1 page).  
Apple—iPod + iTunes (http://www.apple.com/itunes/), as printed on Sep. 12, 2007 (1 page).

* cited by examiner

*Primary Examiner* — Dinku Gebresenbet  
(74) *Attorney, Agent, or Firm* — Lee & Hayes, PLLC

(57) ABSTRACT

Systems and methods are provided for creating personalized programs. In one implementation, a computer-implemented method is provided. According to the method, content is assembled into a personalized program. The method includes maintaining, in a storage device, transaction history information and preference information for a user. The method selects a plurality of content components based on at least one of the transaction history information and the preference information. The method then determines a sequence of the selected content components and assembles the selected content components according to the sequence as the personalized program.

23 Claims, 6 Drawing Sheets

US 9,002,839 B1

PERSONALIZING CONTENT FOR USERS

BACKGROUND

I. Technical Field

The present invention generally relates to the field of computerized systems. More particularly, the invention relates to computerized systems and methods for personalizing content.

II. Background Information

Due to the rapid growth of the Internet, Internet users may access more content than ever before, including a variety of media formats such as audio, video, images, text, etc. For example, an Internet user who is interested in purchasing music might encounter an eclectic range of styles that are available at numerous Internet sites. However, due to the vast array of options, the user may not easily locate music that is suited to his or her individual tastes. Accordingly, Internet users must frequently search though a multitude of options before finding content of interest.

Along with the growing amount of content, the number of Internet retailers has also experienced rapid growth. Internet retailers face new challenges due to both the increased competition of other retailers and the growing volume of content that compete for the attention of Internet users. In particular, gaining new customers and retaining existing customers are areas of key importance to Internet retailers. For example, once an Internet retailer has gained the attention of a potential customer, the potential customer may only browse available products for a limited time before moving on to other content. An Internet retailer must not only attract customers, but also motivate customers to spend greater amounts of time browsing the Internet retailer's sales offerings and, ultimately, making a purchase. The Internet retailer would also like to motivate customers to return at a later time and make additional purchases.

To motivate customers and build customer loyalty, Internet retailers have offered coupons, advertised sales, provided free content, and implemented functionality that allows customers to participate in a community environment (e.g., discussion boards, product reviews and ratings, customer recommendations, etc.). However, these marketing approaches often do not target a particular customer based on that customer's interests. For example, a customer may view an advertisement for a product that is of no interest to the customer. Consequently, these approaches have met with limited success.

As is evident from the foregoing, traditional techniques do not provide marketing opportunities that are tailored to the tastes and interests of individuals. Accordingly, there is a need for improved systems and methods that personalize content for individuals in order to increase browsing time and return visits which, in turn, may increase the potential of converting visits to sales, attract new customers, and build customer loyalty by motivating customers to return for future purchases.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
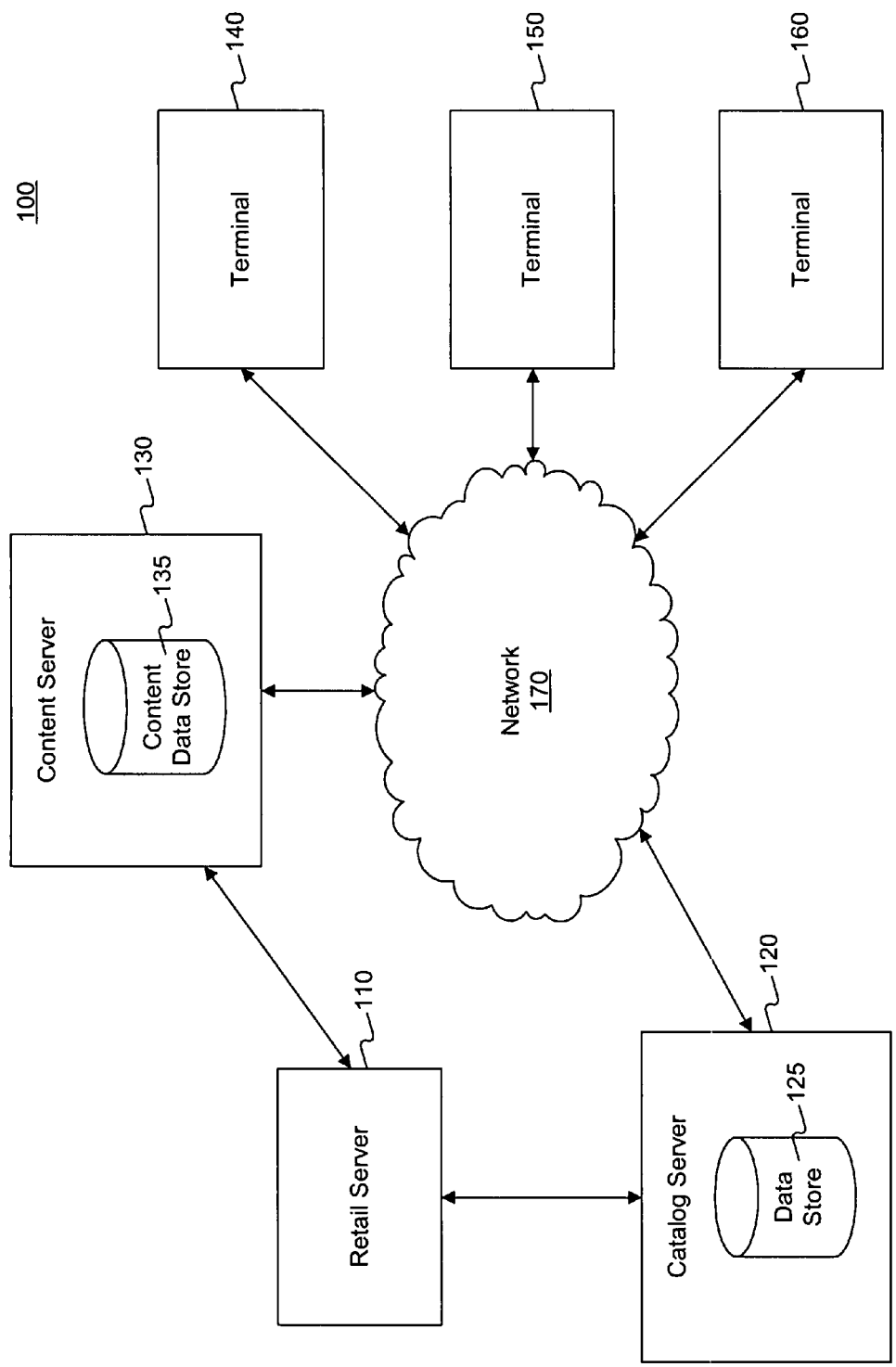
FIG. 1 is a diagram of an example of a system for personalizing content.

The following detailed description refers to the accompanying drawings. Wherever possible, the same reference numbers are used in the drawings and the following description to refer to the same or similar parts. While several exemplary embodiments are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Embodiments disclosed herein provide computer-implemented systems and methods for personalizing content for individual users based on user preferences. The systems and methods may stream (e.g., a webcast) or download personalized programs to users. Personalized programs may be viewed on a terminal, such as a personal computer or a handheld device (e.g., a user may download as a podcast). Personalized programs may be provided as video (e.g., mpeg, avi, etc.) and/or audio (e.g., mp3, way, etc.). For example, content that is incorporated into a personalized program may include music clips or full music pieces (e.g., songs), interviews, motion picture advertisements (e.g., trailers, scenes), video programs, advertisements, etc. Furthermore, a variety of different content components may be selected that share a common theme (e.g., a personalized program featuring new music artists) or may include multiple themes (e.g., a personalized program featuring new music videos, movie previews, and interviews with popular authors).

Content for personalized programs may be retrieved over a network and/or stored by a provider of the personalized programs. For example, content may be produced by the provider of the personalized programs and/or by external parties, such as music artists, motion picture studios, television networks, etc. Content may also include user-generated content. For example, users may upload to a server or otherwise make available user-generated content for possible inclusion in personalized programs. Users that access a personalized program may rate the content and/or purchase items that were discussed in the personalized program. Accordingly, the provider of the personalized programs may provide a referral fee and/or incentive to the content creator based on ratings, purchases, and/or advertising associated with the content. Some of the revenue collected from advertising during personalized programs may be provided to content contributors. Furthermore, aggregated non-customer specific data regarding preferences and feedback may be provided to content providers for a fee and/or as an incentive for contributing content.

To select content components for personalized programs, the provider may make use of a recommendations engine. For example, a recommendations engine may analyze purchase history information, past reviews, past purchases at an electronic retailer site of the provider, past purchases at other retailers, information describing the amount and/or frequency that a user viewed a product and/or product information, etc. Details of a recommendations engine are provided, for example, in U.S. Pat. No. 6,266,649 B1, issued Jul. 24, 2001, entitled "Collaborative Recommendations Using Item-to-Item Similarity Mappings," and U.S. Pat. No. 6,317,722 B1, issued Nov. 13, 2001, entitled "Use of Electronic Shopping Carts to Generate Personal Recommendations," the contents of both which are expressly incorporated herein by reference.

Consistent with a disclosed embodiment, a computer-implemented method provides a personalized program. The method may comprise maintaining, in a storage device, transaction history information and preference information for a user. The method may further select a plurality of content components comprising audio or video content based on at least one of the transaction history information and the preference information. Selecting the plurality of content components may further be based on determining whether any of the content components relate to an item previously purchased by the user or a topic of interest to the user. The method may determine a sequence of the selected content components in order of a predicted interest level of the user and assemble the selected content components according to the sequence as the personalized program. Furthermore, the method may enable the user to view or listen to the personalized program.

Consistent with another disclosed embodiment, a computer-implemented method is provided for assembling content into a personalized program. The method may comprise maintaining, in a storage device, transaction history information and preference information for a user. The method may select a plurality of content components based on at least one of the transaction history information and the preference information; determine a sequence of the selected content components; and assemble the selected content components according to the sequence as the personalized program.

Consistent with yet another disclosed embodiment, a computer-implemented method is provided for selecting content for a personalized program. The method may comprise receiving an identifier of a user; accessing, from a storage device, information associated with the user; and selecting a plurality of content components for the personalized program based on the information associated with the user.

Consistent with still yet another disclosed embodiment, a system is provided for selecting content for a personalized program. The system may comprise a content server and a retail server in communication with the catalog server. The retail server may receive an identifier of a user; access, from a storage device, information associated with the user; and select a plurality of content components for the personalized program based on the information associated with the user.

Consistent with other disclosed embodiments, a computer-readable medium is provided that stores program instructions for implementing any of the above-described methods.

It is to be understood that both the foregoing general description and the following detailed description are exemplary and explanatory only and are not restrictive of the invention or embodiments thereof, as claimed.

Figure 2:
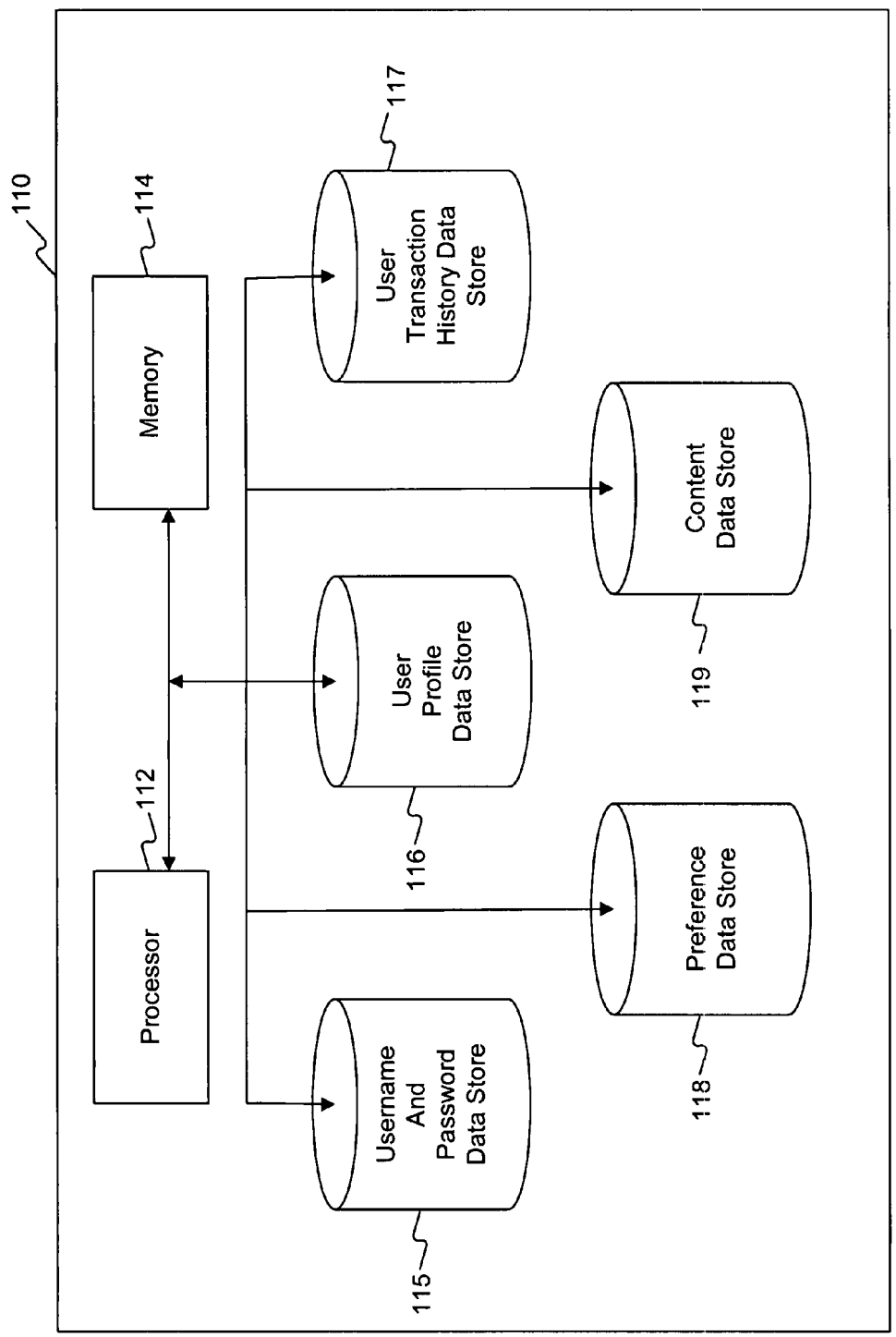
FIG. 2 is a diagram of an example of an architecture of a retail server.

FIG. 1 is an example of a system 100 for personalizing content in accordance with one or more embodiments of the present invention. In particular, system 100 may provide functionality for selecting content components for inclusion in a personalized program. As shown in system 100, retail server 110, catalog server 120, content server 130, and terminals 140-160 are connected to a network 170. One of skill in the art will appreciate that although one retailer server, one catalog server, one content server, and three terminals are depicted in FIG. 1, any number of these components may be provided. One of ordinary skill in the art will also recognize that functions provided by one or more components of system 100 may be combined. For example, functionality provided by retail server 110 and catalog server 120 may be combined. Furthermore, retail server 110 may include a content data store (as shown in FIG. 2) in addition to or in lieu of content server 130.

Network 170 provides communications between the various components in system 100, such as retail server 110, catalog server 120, content server 130, and terminals 140-160. In addition, retail server 110, catalog server 120, content server 130, and/or terminals 140-160 may access legacy systems (not shown) via network 170, or may directly access legacy systems, data stores, or other network applications. Network 170 may be a shared, public, or private network, may encompass a wide area or local area, and may be implemented through any suitable combination of wired and/or wireless communication networks. Furthermore, network 170 may comprise an intranet or the Internet.

Retail server 110 may comprise a general purpose computer (e.g., a personal computer, network computer, server, or mainframe computer) having one or more processors (not shown in FIG. 1) that may be selectively activated or reconfigured by a computer program. Retail server 110 may also be implemented in a distributed network. For example, retail server 110 may communicate via network 170 with one or more additional retail servers (not shown), which may enable retail server 110 to distribute processes for parallel execution by a plurality of retail servers. Alternatively, retail server 110 may be specially constructed for carrying-out methods consistent with disclosed embodiments. Retail server 110 may provide access to an Internet site, as well as provide functionality for authenticating users and transmitting data in connection with the sale of products and/or services. Additional details of retailer server 110 are discussed below in connection with FIG. 2.

Catalog server 120 may comprise a general purpose computer (e.g., a personal computer, network computer, server, or mainframe computer) having one or more processors (not shown) that may be selectively activated or reconfigured by a computer program. Furthermore, catalog server 120 may communicate via network 170 or may be in direct bilateral communication with retail server 110. Catalog server 110 may also be implemented in a distributed network. For example, catalog server 110 may communicate via network 170 with one or more additional catalog servers (not shown) storing additional data.

Catalog server 120 may further include a data store 125. Data store 125 may store data describing items (e.g., products and/or services) offered for sale by an Internet site provided by retail server 110. For example, data store 125 may store pages that are displayable by a computer executing software, such as an Internet browser. Furthermore, data store 125 may store item descriptions, prices, and media used in connection with the sale of the items. Media may include any images, photographs, sounds, and/or video clips that provide samples and/or information pertaining to the items. Products and/or services having information stored in data store 125 may be associated with a unique product identifier (ID).

Content server 130 may comprise a general purpose computer (e.g., a personal computer, network computer, server, or mainframe computer) having one or more processors (not shown) that may be selectively activated or reconfigured by a computer program. Furthermore, content server 130 may communicate via network 170 or may be in direct bilateral communication with retail server 110. Content server 130 may also be implemented in a distributed network. For example, content server 130 may communicate via network 170 with one or more additional content servers (not shown) storing additional data. Content data store 135 may store "content" that may be incorporated in, or combined with, other content to form a "personalized program." "Content" may refer to any form of media, including audio, video, images, text, or any combination of media. Content may also include advertisements. A "content component" may refer to any part or unit of content. Furthermore, a "personalized program" may comprise a plurality of content components.

Terminals 140-160 may be any type device for communicating with retail server 110, catalog server 120, and/or content server 130 over network 170. For example, terminals 140-160 may be personal computers, handheld devices (e.g., PDAs, cellular phones, etc.), or any other appropriate computing platform or device capable of exchanging-data with network 170. Terminals 140-160 may each include a processor and a memory (not shown), for example. Further, terminals 140-160 may execute program modules that provide one or more graphical user interfaces (GUIs) for interacting with network resources, such as retail server 110, catalog server 120, and/or content server 130.

Although users of terminals 140-160 may access and/or receive data from retail server 110, catalog server 120, and/or content server 130, in a preferred embodiment, users at terminals 140-160 may access and/or receive data directly from retail server 110. For example, retail server 110 may retrieve appropriate data from catalog server 120 and/or content server 130 and serve such data to users at terminals 140-160. As the term is used herein, "users" may include individuals purchasing products and/or services or individuals visiting an Internet site provided by retail server 110. Furthermore, "users" may include individuals having electronic accounts, such as accounts storing data in electronic form (e.g., files), financial accounts, social networking accounts, and the like.

Users may access retail server 110 over network 170 through an Internet browser or a software application running on any one of terminals 140-160. For example, retail server 110 may transmit a document (e.g., a web page) that is accessible by an Internet browser executing on one of terminals 140-160. The document may include options for a user to log onto a secure site provided by retail server 110. Because the Internet site may use a secure communication environment, such as an HTTPS (hypertext transfer protocol secure) environment to transfer data over network 170, data transfer is assumed to be secure. Users may log onto the secure site provided by retail server 110, for example, by supplying credentials, such as a username (e.g., email address) and a password.

In implementations of the present invention, retail server 110 may store user profile information, user transaction history information, and/or user preference information. Retail server 110 may further select content components for inclusion in a personalized program based on one more of these kinds of information. The content components may be stored in retailer server 110 (discussed below in further detail) and/or content data store 135. Furthermore, retail server 110 may store rating information associated with personalized programs and use the rating information during selection of a future personalized program. For example, content components for the future personalized program may be selected, at least in part, based on the rating information received from the user. The personalized program may be transmitted from retail server 110 and/or content server 130 to one of user terminals 140-160. Users may download the personalized program for later viewing and/or listening (e.g., to a handheld device) and/or may stream the personalized program for viewing and/or listening (e.g., to a browser application).

FIG. 2 shows a diagram of an example architecture of retail server 110, in accordance with one or more embodiments of the present invention. Retail server 110 may include a processor 112 and a memory 114. Memory 114 may be one or more memory or storage devices that store data as well as software. Memory 114 may also comprise one or more of RAM, ROM, magnetic storage, or optical storage, for example. Memory 114 may store program modules that, when executed by processor 112, perform one or more processes for operating an Internet site. Furthermore, memory 114 may store program modules that provide functionality for selecting and/or providing a personalized program.

Retail server 110 may further include a username and password data store 115, a user profile data store 116, a user transaction history data store 117, a preference data store 118, and a content data store 119. In implementations of the present invention, retail server 110 may transmit a page to the user including data retrieved from one or more of username and password data store 115, user profile data store 116, user transaction history data store 117, reference data store 118, and content data store 119. In some implementations, content data store 119 may be omitted in lieu of content data store 135, discussed above in connection with FIG. 1. In other implementations, retail server 110 may access both content data store 119 and content data store 135 for content components (e.g., a personalized program includes four content components, one of which are stored in content data store 119 and the other three of which are stored in content data store 135).

Username and password data store 115 may store username and password combinations for users of an Internet site provided by retail server 110. For example, username and password data store 115 may store username and password combinations in one or more secure tables. Retail server 110 may receive user name and password combinations from users at terminals 140-160 and may access the secure tables in order to authenticate users to the Internet site.

User profile data store 116 may store information pertaining to users. For example, a user may have a profile including information such as name, billing address, shipping address, payment information (e.g., credit card, debit card, account numbers, etc.), age, occupation, etc. Users at terminals 140-160 may provide user profile data when creating an account and may subsequently update user profile data.

User transaction history data store 117 may store transaction histories of users relating to transactions. Transactions may include any activities participated in by users and/or provided by an Internet site, such as, for example, game histories, email histories, auction histories, download histories, search histories, and/or purchase histories. For example, a purchase history may include information about orders including completed orders (e.g., orders for products and/or services that have been shipped or provided), open orders (e.g., orders for products and/or services that have been placed, but have not been shipped or provided), past items that have been viewed and/or added to a shopping cart, and/or search results. For past items that have been viewed and/or added to a shopping cart, transaction history information may include frequency information (e.g., how many times a user viewed and/or added an item to a shopping cart) and duration information (e.g., how much time a user spent viewing a particular item before navigating away from the item and/or how much time a user included a particular item in a shopping cart). Purchase histories may include the product IDs of the products purchased by users. Product IDs may include product names and/or product numbers, UPCs (Universal Product Codes), ISBN (International. Standard Book Number), or any other identifier.

Preference data store 118 may include ratings information for any items or topics, including ratings of items previously purchased or owned by a user, or ratings of any topic of interest (e.g., news, sports, entertainment, products, etc.) to a user. For example, ratings of products, services, and/or topics may be stored according to a numerical point scale (e.g., representing ratings on a scale of one to five stars). Such a rating may indicate an interest level, satisfaction level, or indication of whether the user would recommend a product and/or service to another user. Rating information may also include ratings of personalized programs and/or content components.

Content data store 119 may include content, including content components that retail server 110 may use to assemble a personalized program. Assembling of content components may include formulating, creating, storing, or generating a personalized program that includes one or more content components. Accordingly, content data store 119 may include additional data in addition to or in lieu of content data store 135 shown in FIG. 1.

Figure 3:
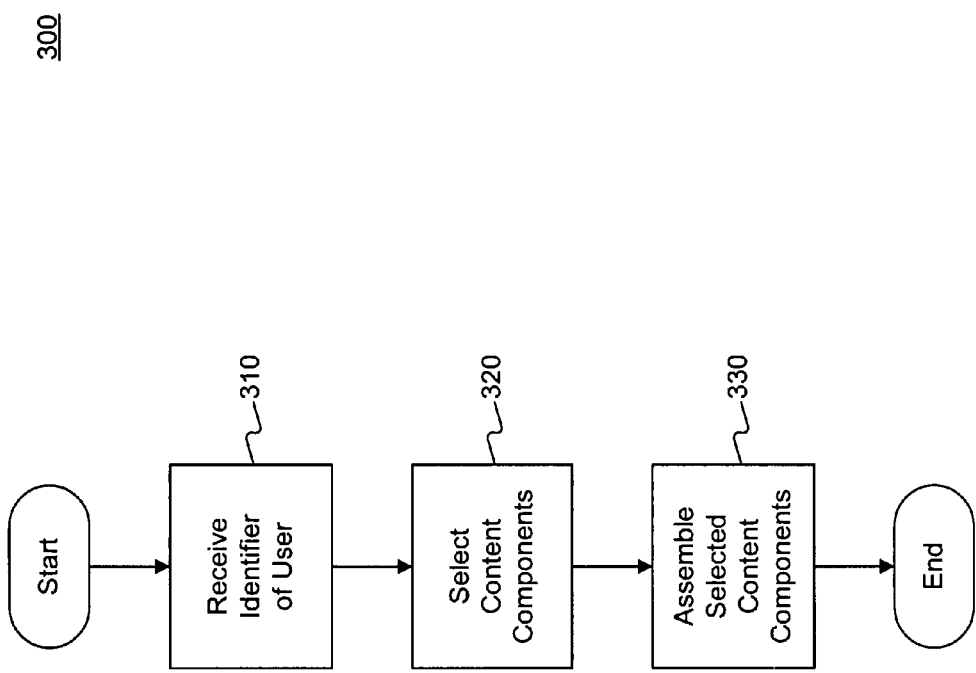
FIG. 3 is an example of a flow diagram of a routine for personalizing content.

FIG. 3 is a flow diagram of an example of a routine 300 for personalizing content in accordance with one or more embodiments of the present invention. Routine 300 may implement processes according to one or more of program modules stored in memory 114.

At the start of routine 300, in block 310, retail server 110 may receive an identifier of a user. For example, a user at one of terminals 140-160 may have logged onto a retail Internet site and selected an option to sign up for and/or receive a personalized program. The identifier may include, for example, the username of the user.

Next, in block 320, retail server 110 may select content components for a personalized program that is specific to the user. Retail server 110 may select the content components from content data store 119 and/or content data store 135. The personalized program may comprise video (e.g., mpeg, avi, etc.) and/or audio (e.g., mp3, way, etc.). Content that is incorporated into a personalized program may include, for example, music clips or full music pieces (e.g., songs), interviews, motion picture advertisements (e.g., trailers, scenes, deleted scenes, interviews, etc.), full video programs, advertisements, etc. Content components may share a common theme (e.g., a personalized program featuring new music artists) or may include multiple themes (e.g., a personalized program featuring new music videos, movie previews, and interviews with popular authors).

Content components may include introductions (e.g., bumpers where an artist introduces a track of an album or an actor introduces a movie). Moreover, content components may include news stories and/or news headlines. Furthermore, content components, such as news stories, may be selected based on the user's ZIP code, which may be stored by user profile data store 116. Based on the user's ZIP code, for example, retail server 110 may provide the user with additional information, such as concert dates or movie times for artists or movies featured in the personalized program. Furthermore, advertising may be included in the personalized program, which may be related to content components and/or products of potential interest to the user. For example, advertising may be inserted at the beginning, end, or in between content components.

Retail server 110 may select content components based on data in user profile data store 116, user transaction history data store 117, and/or preference data store 118. For example, content components may be selected based on a user's location, prior transactions (e.g., purchases) and/or data access by the user (e.g. past items that have been viewed and/or added to a shopping cart, frequency information regarding how many times a user viewed and/or added an item to a shopping cart, and duration information regarding how much time a user spent viewing a particular item before navigating away from the item and/or maintained a particular item in a shopping cart, etc.). Furthermore, content components may be selected based on ratings information for any items or topics, including ratings of items previously purchased or owned, or ratings of any topic of interest (e.g., news, sports, entertainment, products, etc.). Still further, content components may be selected based on rating information for previously viewed personalized programs and/or content components. Retail server 110 may make any of the above selections through the use of software instructions that implement functionality of a recommendations engine to evaluate and decision data.

In block 330, retail server 110 may assemble the selected content components into the personalized program. Retail server 110 may determine a sequence of selected content components according to a predicted interest level of the user or may sequence the selected content components in any order (e.g., a random order). For example, retail server 110 may assign a numerical score based upon a determination of a likelihood that the user will enjoy a selected content component. The numerical score may be based upon a correlation between the content component and other data related to the user (e.g., the user has purchased a large number of books by the author featured in the content component).

Retail server 110 may further store metadata representing a personalized program. For example, the metadata may identify a content component (e.g., an identifier of the component) and/or a storage location of the content component (e.g., content data store 119 or content data store 135). The metadata for a personalized program may also include a sequence order for the content components (e.g., a play list of content components for a particular personalized program).

Retail server 110 may store the assembled personalized program in content data store 119 and/or content data store 135. Alternatively, or in addition, retail server 110 may store metadata representing a personalized program in content data store 119 and/or content data store 135. The metadata, as discussed above, may be used to identify the content components that comprise a personalized program. Accordingly, retail server 110 may efficiently store content components and access content components according to the metadata. Retail server 110 may stream (e.g., a webcast) or download the personalized program to a user, who may view the personalized program on one of terminals 140-160.

Assembling may alternatively be done at terminals 140-160 and/or content server 120. Accordingly, in some implementations, retail server 110 may transmit metadata identifying content components of a personalized program to content server 130 and/or terminals 140-160, which may then access the content components from content data store 119 and/or content data store 135, as needed, according to a predetermined order (e.g., a play list) specified by the metadata.

Figure 4:
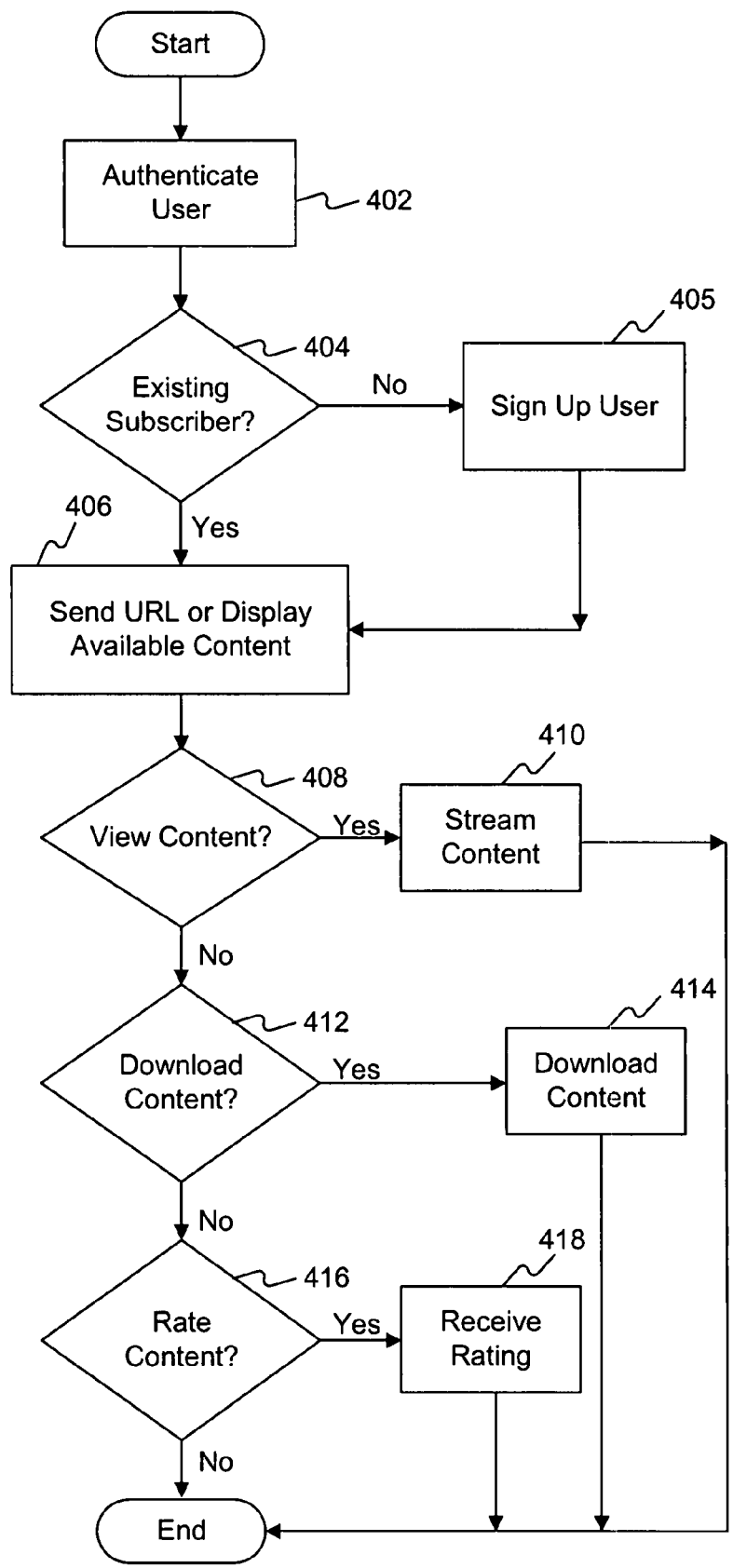
FIG. 4 is an example of a flow diagram of another routine for personalizing content.

FIG. 4 is a flow diagram, of an example of a routine 400 for personalizing content in accordance with one or more embodiments of the present invention. Routine 400 may implement processes according to one or more of program modules stored in memory 112.

At the start of routine 400, in block 402, retail server 110 may authenticate a user. For example, to access an account at an Internet site, a user may submit credentials to the Internet site (e.g., username and password), which are then authenticated by retail server 110.

In decision block 404, retail server 110 may determine whether the user is an existing subscriber to a feature that provides personalized programs. If the user is not an existing subscriber, then the process proceeds to block 405. If the user is an existing subscriber, then the process proceeds to block 406.

In block 405, to sign up as a new user, a user might select a "sign up" button. Furthermore, if the user is new to the Internet site provided by retail server 110, the account associated with the user may not include a sufficient amount of data (e.g., preference data) for selecting content components. Accordingly, new users may be prompted for more data (e.g., a new user may need to rate some products, categories of music, etc., before proceeding).

In bock 406, retail server 110 may send a URL or display available content to the user. For example, retail server 110 may transmit a URL (e.g., to a Really Simple Syndication (RSS) feed) to one of terminals 140-160. Such a URL may be used by one of terminals 140-160 (e.g., a handheld device) to access the personalized program. At periodic intervals, one of terminals 140-160 may access the feed and automatically download the personalized program. Alternatively, or in addition, retail server 110 may transmit a document (e.g., a page) to one of terminals 140-160 including access to personalized programs. For example, the document may include links to previous personalized programs (e.g., a personalized program from last month) and may include a most recent personalized program (e.g., today's new program). Content components included in personalized programs may be selected as discussed above in connection with FIG. 3.

Next, in decision block 408, retail server 110 may determine whether the user wishes to access the personalized program or wait until a later time. If user wishes to access the personalized program, then the routine proceeds to step 410. If the user does not wish to access the personalized program until a later time, then the routine proceeds to decision block 412.

In block 410, retail server 110 (and/or content server 120) may stream the personalized program to the user. For example, retail server 110 may retrieve an assembled personalized program and/or assemble content components according to metadata stored in content data store 119 and/or content data store 135. For example, terminal 140 may be a handheld device or personal computer that plays the personalized program. An example of a user interface for viewing personalized content is discussed below in connection with FIGS. 5A and 5B in more detail.

In decision block 412, retail server 110 may determine whether to download the personalized program to one of user terminals 140-160. If the user wishes to download the personalized program to one of user terminals 140-160, then the routine proceeds to block 414. If the user does not wish to download the personalized program to one of user terminals 140-160, then the routine proceeds to decision block 416.

In block 414, retail server 110 may transmit the content for download to one of user terminals 140-160. For example, user terminal 140 may be a handheld device or a personal computer, which may directly store the personalized program. As another example, terminal 150 may interface with a handheld device, which may receive and/or store the personalized program from terminal 150.

In decision block 416, retail server 110 may prompt the user as to whether the user wishes to rate a personalized program and/or content components including in the personalized program. A user may rate a current personalized program and/or content components, or a previously viewed and/or downloaded personalized program and/or content components. Retail server 110 may use rating information for personalized programs and/or content components as part of the selection process for future personalized programs. If the user wishes to rate a personalized program and/or content components included in a personalized program, then the routine proceeds to block 418. If the user does not wish to rate a personalized program and/or content components included in a personalized program, then the routine ends.

In block 418, retail server 110 may receive a rating from the user from one of terminals 140-160 of a content component and/or the entire personalized program. For example, the user may select a rating from a display of one of terminals 140-160, which may then transmit the rating to retail server 110.

As one of ordinary skill in the art will appreciate, one or more of blocks 310-330 and 402-418 may be optional and may be omitted from implementations in certain embodiments. Furthermore, in some implementations, blocks 310-330 and 402-418 may be reordered, include substitute steps, and/or include additional steps. For example, rating a personalized programs and/or content components may occur after step 410 or 414 in some implementations.

Figure 5A:
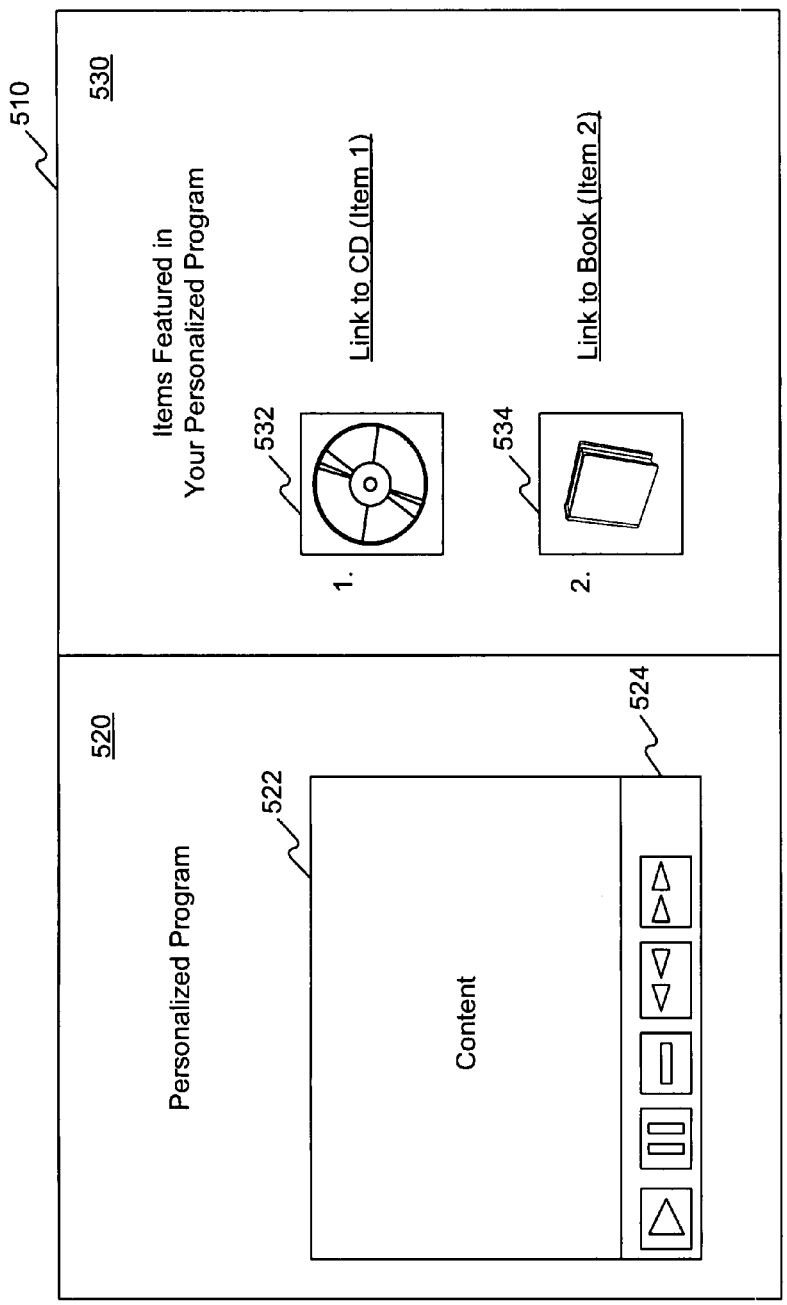
FIG. 5A is an example of a user interface providing personalized content and enabling access to items featured in the personalized content.

FIG. 5A is an example of a user interface 510 for providing personalized content and enabling access to items featured in the personalized content consistent with aspects of the present invention. As discussed above, retail server 110 may transmit data for user interface 510 after the user has navigated to and/or logged into an Internet site.

As shown in FIG. 5A, user interface 510 may be divided into two portions, such as portions 520 and 530 (e.g., portions 520 and 530 may be implemented via HTML framesets). As shown, portion 520 includes a media player 522, which includes a control panel 524. Media player 522 may play video and/or audio. For a content component including audio only, media player 522 may display, for example, still images or no images during playback. Furthermore, a user may select buttons on control panel 524 to play, pause, stop, rewind, fast forward, etc., the personalized program. Portion 530 may include item 532 and item 534, along with associated links. For example, item 532 (e.g., a CD) and item 534 (e.g., a book) may include an image of a product that is featured in a personalized program. Items 532 and 534 may be accompanied by, for example, hypertext links, which when selected, may provide further information regarding items 532 and 534.

Figure 5B:
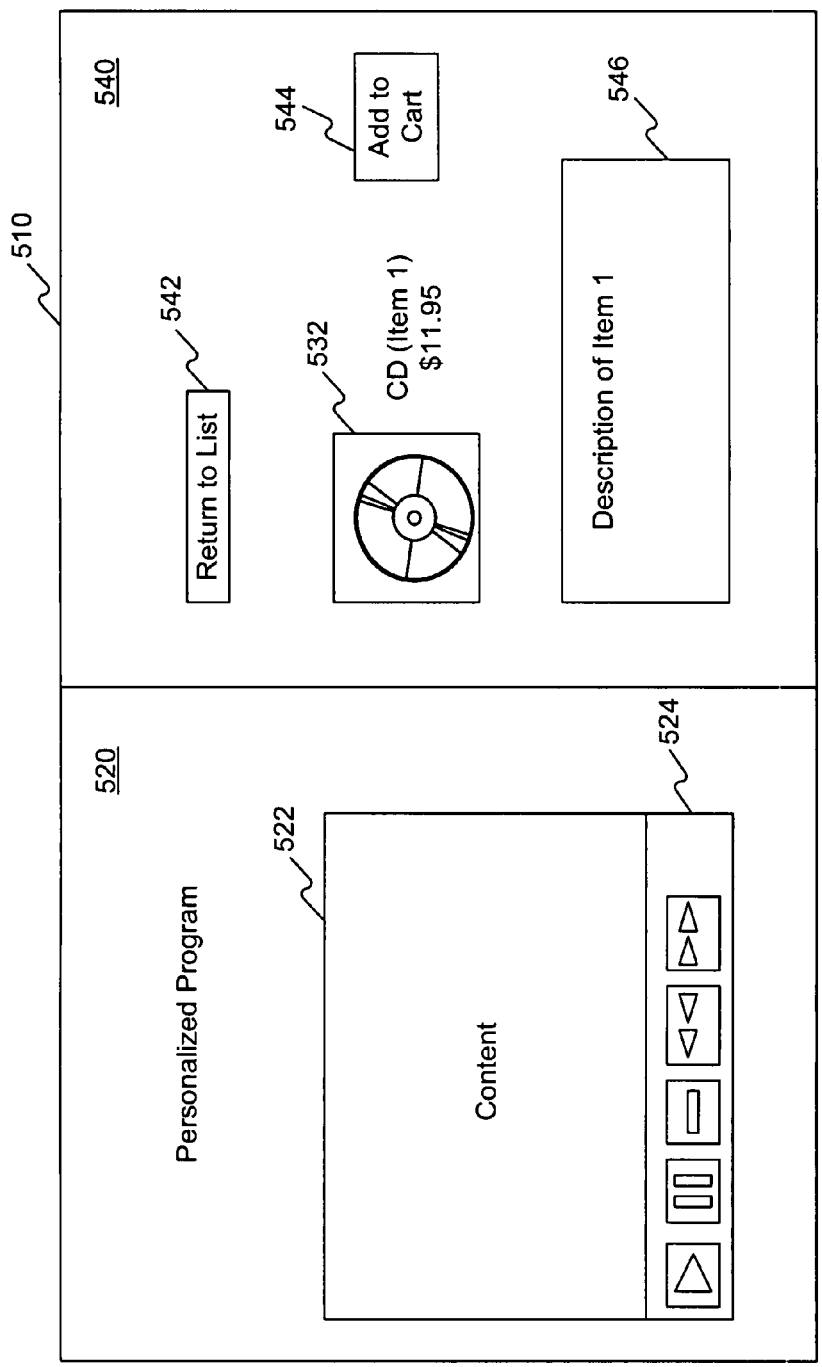
FIG. 5B is an example of a user interface providing personalized content and information associated with an item featured in the personalized content.

FIG. 5B is an example of user interface 510 providing personalized content and information associated with an item featured in the personalized content consistent with aspects of the present invention. As shown in FIG. 5B, user interface 510 includes portion 520, as discussed above in connection with FIG. 5A. Furthermore, user interface 510 includes portion 540, which displays information associated with item 532. Portion 540 may replace portion 530, for example, when a user selects a link appearing on portion 530. Item 532 may include a description 546 (e.g., details describing a product). Portion 540 may also include a "return to list" icon 542 and an "add to cart" icon 544. "Return to list" icon 542 may enable a user to return to viewing portion 530 and "add to cart" icon 544 may add the displayed item to a user's shopping cart for purchase.

User interface 510 may further indicate that, as a subscriber to the personalized programs feature, the user is entitled to an "incentive." An "incentive" may include a discount, coupon, rebate, free gift, etc. Incentives may be provided when a user purchases a product featured in a personalized program and/or when a user rates a personalized program and/or program component. Advertisements, which were previously discussed, may include an incentive. Thus, incentives may also constitute content components. For example, during playback of a personalized program including movie previews for recently released DVDs, media player 522 may offer the user (e.g., by displaying a code included in the content) a discount of 10% off the purchase price of any DVD featured in the personalized program if the user makes the purchase within a predetermined time period (e.g., purchases within a week). Alternatively, after playback of a personalized program, the user may be offered an incentive via, for example, information displayed via media player 522 and/or as part of a document displayed on user interface 510.

User interface 510 may still further provide options for a user to rate a component of a personalized program or an entire personalized program. In some implementations, description 546 may provide an indication of why a content component was selected (e.g., "We recommended 'X' because you rated 'Y'."), additional recommendations (e.g., "People who liked 'X' also liked 'Z'."), options for the user to make a recommendation to a friend, access to bonus material related to content components, links to other Internet sites related to content components, an option for the user to write a review of a content component, the personalized program, and/or a product, receive a teaser for an upcoming personalized program, or receive experimental content components (e.g., selecting content components that have less of a correlation with the user's preferences or content components that are selected randomly). Furthermore, any one or more of the above discussed features may constitute a content component, which may be included in a personalized program (e.g., during playback of a personalized program, a content component may allow a user to recommend the content component to a friend by, for example, providing the friend's e-mail address).

The foregoing-description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting or deleting blocks, without departing from the principles of the invention. It is intended, therefore, that the specification and examples be considered as exemplary only, with a true scope and spirit of the invention being indicated by the following claims and their full scope of equivalents.

What is claimed is:

1. A computer-implemented method for providing a personalized audio or video program, comprising:

maintaining, in a storage device, transaction history information and preference information for a user;

selecting a plurality of audio or video content based at least in part on the transaction history information or the preference information, wherein selecting the plurality of audio or video content is further based at least in part on accessing metadata associated with the plurality of audio or video content to select the plurality of audio or video content such that at least one product or service is presented in the plurality of audio or video content as a theme;

computing values indicative of an interest level of the user in the selected plurality of audio or video content, based at least in part on a correlation between the at least one product or service presented as the theme in the selected plurality of audio or video content and the transaction history information or the preference information;

determining a listening or viewing sequence of the selected plurality of audio or video content to be listened to or viewed based at least in part on the computed values, the listening or viewing sequence further comprising one or more incentives to purchase the at least one product or service presented as the theme in the selected plurality of audio or video content;

assembling the selected plurality of audio or video content into the personalized audio or video program according to the listening or viewing sequence;

transmitting the personalized audio or video program to a handheld device of the user; and providing for display on the handheld device while the user views or listens to the transmitted personalized audio or video program on the handheld device, information about the at least one product or service presented as the theme in the selected plurality of audio or video content and the one or more incentives.

2. The method of claim 1, wherein the transaction history information identifies items previously purchased by the user and the preference information identifies topics of interest to the user.

3. The method of claim 1, wherein the preference information includes at least a user rating of a topic or an item.

4. A computer-implemented method for assembling at least one of audio and video into a personalized audio or video program, comprising:

maintaining, in a storage device, transaction history information and preference information for a user;

selecting a plurality of audio or video components based at least in part on the transaction history information or the preference information, wherein selecting the plurality of audio or video components is further based at least in part on accessing metadata associated with the plurality of audio or video components to select the plurality of audio or video components such that at least one product or service is presented in the plurality of audio or video components as a theme;

computing values indicative of an interest level of the user in the plurality of selected audio or video components, based at least in part on a correlation between information associated with the plurality of selected audio or video components and the transaction history information or the preference information;

determining a listening or viewing sequence of the plurality of selected audio or video components to be listened to or viewed based at least in part on the computed values, the listening or viewing sequence further comprising one or more incentives to purchase the at least one product or service presented as the theme in the plurality of selected audio or video components;

assembling the plurality of selected audio or video components into the personalized audio or video program according to the listening or viewing sequence; and providing for display, information about the at least one product or service presented as the theme in the plurality of selected audio or video components and the one or more incentives.

5. The method of claim 4, wherein the transaction history information identifies items previously purchased by the user, and the preference information identifies topics of interest to the user.

6. The method of claim 4, wherein the preference information comprises a user rating of a topic or an item.

7. The method of claim 4, wherein determining the listening or viewing sequence comprises inserting an introduction preceding the first of the plurality of selected audio or video components.

8. The method of claim 7, wherein the introduction is an advertisement.

9. The method of claim 4, wherein determining the listening or viewing sequence comprises inserting an advertisement as one of the plurality of selected audio or video components.

10. The method of claim 4, further comprising:
downloading or streaming the personalized audio or video program to a handheld device.

11. The method of claim 4, further comprising:
receiving a rating of at least one of the plurality of selected audio or video components; and
assembling a new personalized audio or video program for the user based at least in part on the rating.

12. The method of claim 4, further comprising:
enabling the user to purchase the at least one product or service presented as the theme in the plurality of selected audio or video components.

13. A computer-implemented method for selecting audio or video content for a personalized audio or video program, comprising:
receiving an identifier of a user;
accessing, from a storage device, information associated with the user;
selecting a plurality of audio or video content components for the personalized audio or video program based at least in part on the information associated with the user, wherein selecting the plurality of audio or video content components is further based at least in part on accessing metadata associated with the plurality of audio or video content components to select the plurality of audio or video content components such that at least one product or service is presented in the plurality of audio or video content components as a theme;

computing values indicative of an interest level of the user in the plurality of selected audio or video content components, based at least in part on a correlation between information associated with the plurality of selected audio or video content components and the information associated with the user;

determining a listening or viewing sequence of the plurality of selected audio or video content components based at least in part on at least the computed values, the listening or viewing sequence further comprising one or more incentives to purchase the at least one product or service presented as the theme in the plurality of audio or video components; and providing for display, information about the at least one product or service presented as the theme in the plurality of selected audio or video content components and the one or more incentives.

14. The method of claim 13, wherein selecting the plurality of audio or video content components based at least in part on the information associated with the user comprises:
determining whether any of the plurality of audio or video content components relates to an item previously purchased by the user.

15. The method of claim 13, wherein selecting the plurality of audio or video content components based at least in part on the information associated with the user comprises:
determining whether any of the plurality of audio or video content components relates to a topic of interest to the user.

16. The method of claim 13, further comprising:
assembling the plurality of selected audio or video content components into the personalized audio or video program according to the listening or viewing sequence.

17. The method of claim 13, wherein the information associated with the user comprises transaction history information, preference information, or profile information.

18. A system for selecting audio or video content for a personalized audio or video program, the system comprising:
one or more processors; and
memory storing computer-executable instructions that, when executed by the one or more processors, perform at least:
receiving an identifier of a user;
accessing, from a storage device, information associated with the user;
selecting a plurality of audio or video content components for the personalized audio or video program based at least in part on the information associated with the user, wherein selecting the plurality of audio or video content components is further based at least in part on accessing metadata associated with the plurality of audio or video content components to select the plurality of audio or video content components such that at least one product or service is presented in the plurality of audio or video content components as a theme;
computing values indicative of an interest level of the user in the plurality of selected audio or video content components, based at least in part on a correlation between information associated with the plurality of selected audio or video content components and the information associated with the user;

determining a listening or viewing sequence of the plurality of selected audio or video content components based at least in part on the computed values, the listening or viewing sequence further comprising one or more incentives to purchase the at least one product or service presented as the theme in the plurality of audio or video content components; and providing for display, information about the at least one product or service presented as the theme in the plurality of selected audio or video content components and the one or more incentives.

19. The system of claim 18, wherein the memory further stores computer-executable instructions that, when executed by the one or more processors, performs at least:

determining the listening or viewing sequence for the plurality of selected audio or video content components based at least in part on at least the computed values.

20. The system of claim 18, wherein the information associated with the user comprises transaction history information, preference information, or profile information.

21. The system of claim 18, wherein the memory further stores computer-executable instructions that, when executed by the one or more processors, performs at least:

providing the personalized audio or video program to a handheld device or streaming the personalized audio or video program to a browser application.

22. The method of claim 1, wherein the transmitted personalized audio or video program is provided for display in a first portion of a user interface and the information about the at least one product or service presented as the theme in the selected plurality of audio or video content is provided for display in a second portion of the user interface that is adjacent to the first portion.

23. The method of claim 22, wherein the first portion comprises a media player and the media player offers the one or more incentives to purchase the at least one product or service presented as the theme in the transmitted personalized audio or video program.

* * * * *